United States Patent
Chu

(10) Patent No.: US 12,512,646 B2
(45) Date of Patent: Dec. 30, 2025

(54) METHOD FOR MANUFACTURING A DISTRIBUTED BRAGG REFLECTOR FOR 1550 NM VERTICAL-CAVITY SURFACE-EMITTING LASER

(71) Applicant: Well & Fortune Tech. LLC, Hsin-Chu (TW)

(72) Inventor: Chao-Chieh Chu, Hsin-Chu (TW)

(73) Assignee: WELL & FORTUNE TECH. LLC, Hsin-Chu (TW)

( * ) Notice: Subject to any disclaimer, the term of this patent is extended or adjusted under 35 U.S.C. 154(b) by 558 days.

(21) Appl. No.: 18/049,828

(22) Filed: Oct. 26, 2022

(65) Prior Publication Data

US 2024/0146028 A1 May 2, 2024

(51) Int. Cl.
H01S 5/183 (2006.01)

(52) U.S. Cl.
CPC ...... H01S 5/18372 (2013.01); H01S 5/18375 (2013.01); H01S 5/18377 (2013.01)

(58) Field of Classification Search
None
See application file for complete search history.

(56) References Cited

U.S. PATENT DOCUMENTS

2005/0243886 A1 11/2005 Wang et al.
2013/0342900 A1* 12/2013 Koeckert ............ G02B 5/0875
                                                       359/359
2021/0336422 A1* 10/2021 Tan .................... H01S 5/18327
2023/0207606 A1*  6/2023 Mezouari ............ H10H 20/856
                                                        257/79

FOREIGN PATENT DOCUMENTS

| CN | 106654860 A | 5/2017 |
| TW | 200414642 A | 8/2004 |
| TW | 201404944 A | 2/2014 |

* cited by examiner

Primary Examiner — Antonio B Crite
Assistant Examiner — Adin Hrnjic
(74) Attorney, Agent, or Firm — Li & Cai Intellectual Property (USA) Office

(57) ABSTRACT

A method for manufacturing a distributed Bragg reflector is provided. The distributed Bragg reflector is applied to a 1550 nm vertical-cavity surface-emitting laser, which structurally includes a top distributed Bragg reflector, a bottom distributed Bragg reflector, and a vertical cavity (including a P-type and an N-type electrode) and a multiple quantum well light-emitting layer that are positioned therebetween. An optical multilayer film of the distributed Bragg reflector is formed by sputtering, and includes silicon layers and silicon dioxide layers alternately stacked to each other. The silicon dioxide layers are produced by a process of nano-sputtering and micro-plasma oxidation. A reflectance of the bottom distributed Bragg reflector at 1,550 nm is greater than 99.9%, and a reflectance of the top distributed Bragg reflector at 1,550 nm is controlled to be between 95% and 99%, so that basic physical/optical requirements for forming a resonant laser can be improved.

9 Claims, 11 Drawing Sheets

METHOD FOR MANUFACTURING A DISTRIBUTED BRAGG REFLECTOR FOR 1550 NM VERTICAL-CAVITY SURFACE-EMITTING LASER

FIELD OF THE DISCLOSURE

The present disclosure relates to a method for manufacturing a distributed Bragg reflector, and more particularly to a method for manufacturing a top distributed Bragg reflector or a bottom distributed Bragg reflector for a 1550 nm vertical-cavity surface-emitting laser.

BACKGROUND OF THE DISCLOSURE

Compared with a conventional edge emitting laser, a vertical-cavity surface-emitting laser (VCSEL) has advantages of being low in power consumption, allowing for an easy cooperation with an optical fiber coupling, and being easily made into a laser array. Hence, the vertical-cavity surface-emitting laser has become one of the light-emitting elements that are currently attracting the most attention.

An existing vertical-cavity surface-emitting laser device includes at least a P-type electrode, an N-type electrode, a multiple quantum well (MQW) active layer for generating photons, and top and bottom distributed Bragg reflectors (DBR) that are respectively disposed on two sides of the MQW active layer. The P-type electrode and the N-type electrode inject electric currents into the MQW active layer to excite the photons, and the top and bottom distributed Bragg reflectors are used to form a vertical cavity, so that a laser beam emitted from an element surface (i.e., along a direction that is perpendicular to the MQW active layer) can be generated.

In the conventional technology, by way of metal-organic chemical vapor deposition (MOCVD), semiconductor materials of different refractive indexes are alternately stacked onto a substrate to form a semiconductor film, so that a distributed Bragg reflector can be formed. Further, through a selection of materials and a thickness design, an effect of reflecting light of a specific wavelength can be achieved.

In the vertical-cavity surface-emitting laser, the distributed Bragg reflector needs to have an extremely high reflectance, so that basic physical/optical requirements for forming a resonant laser may be improved. Specifically, the top distributed Bragg reflector is required to have a reflectance of at least 96%, and the bottom distributed Bragg reflector is required to have a reflectance of 99.9%. For the conventional semiconductor material, about 60 layers of the semiconductor film are required to achieve a high reflectance. Therefore, the conventional distributed Bragg reflector has disadvantages that include having a complex structure and a complicated manufacturing process.

SUMMARY OF THE DISCLOSURE

In response to the above-referenced technical inadequacies, the present disclosure provides a method for manufacturing a distributed Bragg reflector.

In one aspect, the present disclosure provides a method for manufacturing a distributed Bragg reflector. The distributed Bragg reflector is applied to a 1550 nm vertical-cavity surface-emitting laser for being used as a top distributed Bragg reflector or a bottom distributed Bragg reflector. The method includes: forming an optical multilayer film on a substrate, in which the substrate is a silicon wafer, a gallium arsenide wafer, a silicon carbide wafer, or a glass substrate.

When the distributed Bragg reflector is applied to the 1550 nm vertical-cavity surface-emitting laser for being used as the bottom distributed Bragg reflector, the step of forming the optical multilayer film includes: forming a molybdenum layer on the substrate, forming a silver layer on the molybdenum layer, and forming silicon layers and silicon dioxide layers that are alternately stacked to each other on the silver layer. The silicon dioxide layers are formed by a process of nano-sputtering and micro-plasma oxidation.

Therefore, in the method for manufacturing the distributed Bragg reflector provided by the present disclosure, by virtue of "forming the silicon layers and the silicon dioxide layers that are alternately stacked to each other on the silver layer" and "forming the silicon dioxide layers by the process of nano-sputtering and micro-plasma oxidation," the bottom distributed Bragg reflector can be enhanced to have a reflectance of 99.9%, thereby improving a light-emitting efficiency of a laser device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
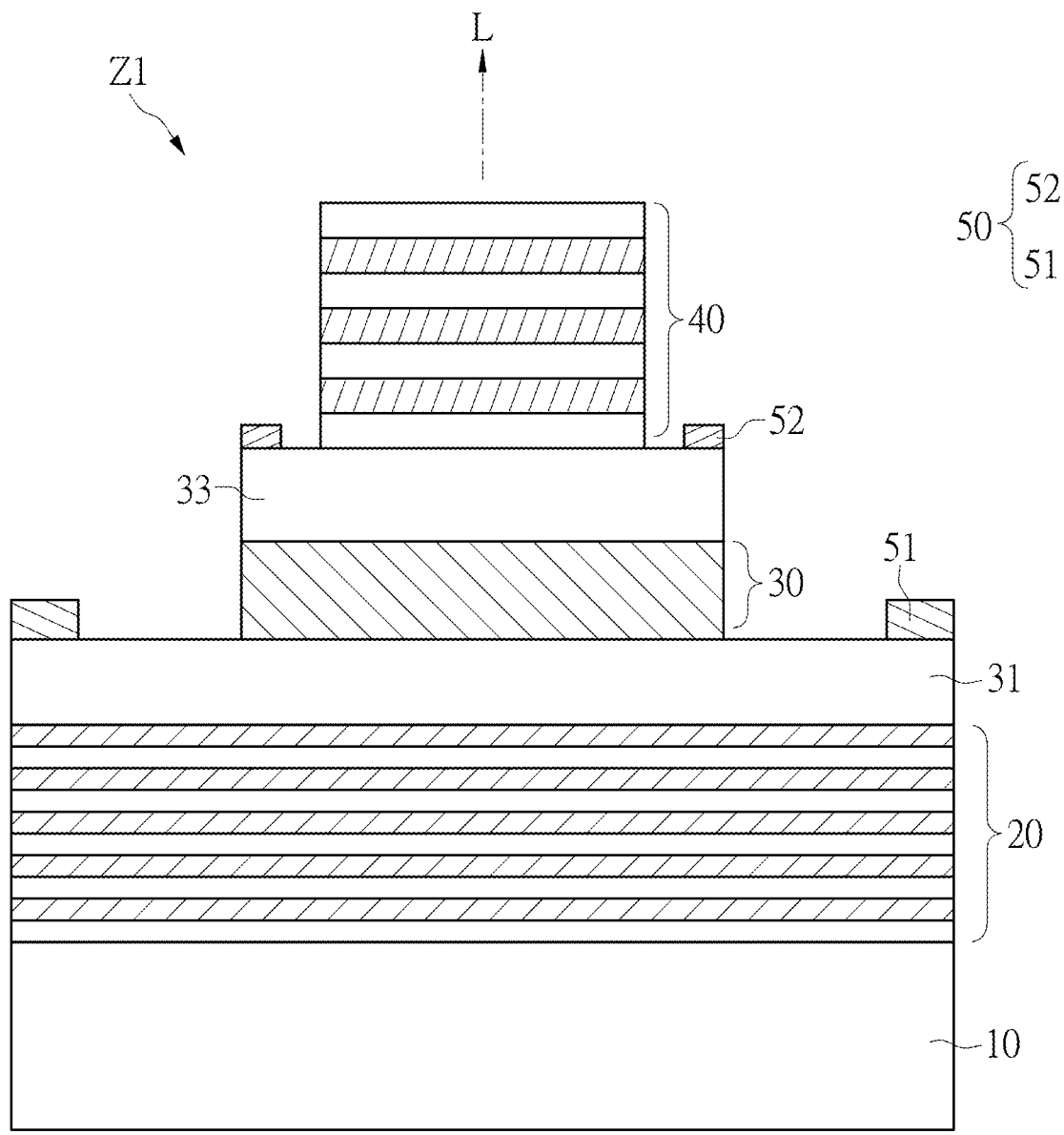
FIG. 1 is a side view of a vertical-cavity surface-emitting laser according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, the present disclosure provides a laser device Z1, which is particularly suitable to be used as a laser device of infrared light wavelengths (the wavelength being 1,550 nm). Under the premise that safety regulations are met, the laser device Z1 can emit a laser beam L having a sufficient light intensity.

In the present embodiment, the laser device Z1 is a vertical-cavity surface-emitting laser (VCSEL) device, and uses two distributed Bragg reflectors (DBR) as reflector layers. In this way, an initial light beam generated by the laser device Z1 can be repeatedly reflected and resonated between the two reflector layers for gain amplification, such as to eventually emit the laser beam L.

It should be noted that the reflector layer of the present disclosure is formed by a process of nano-sputtering and micro-plasma oxidation, and not by a chemical vapor deposition technique. Accordingly, a bottom distributed Bragg reflector is able have a reflectance as high as 99.9% when the reflector layer of the present disclosure only has a small number of film layers, such that the laser device Z1 of the present disclosure can be applied to an automotive radar and in light detection and ranging (LiDAR).

As shown in FIG. 1, the laser device Z1 includes a bottom distributed Bragg reflector 20, a multiple quantum well (MQW) active light-emitting structure layer 30, and a top distributed Bragg reflector 40. Specifically, in the present embodiment, the laser device Z1 further includes a substrate 10. The bottom distributed Bragg reflector 20, the MQW active light-emitting structure layer 30, and the top distributed Bragg reflector 40 are disposed on the substrate 10, and the MQW active light-emitting structure layer 30 is positioned between the bottom distributed Bragg reflector 20 and the top distributed Bragg reflector 40.

The substrate 10 can be an insulating substrate or a semiconductor substrate. The insulating substrate can be, for example, a glass substrate. The semiconductor substrate can be, for example, a silicon semiconductor, a germanium semiconductor, a silicon carbide semiconductor, or a III-V group semiconductor. The III-V group semiconductor can be, for example, gallium arsenide (GaAs), indium phosphide (InP), aluminum nitride (AlN), indium nitride (InN), or gallium nitride (GaN).

The bottom distributed Bragg reflector 20 and the top distributed Bragg reflector 40 each include first film layers (i.e., silicon layers 21) and second film layers (i.e., silicon dioxide layers 22) that are alternately stacked to each other. A refractive index of the first film layer is greater than a refractive index of the second film layer. When light enters the second film layer from the first film layer, if the condition of an angle of incidence being greater than a critical angle is met, a total internal reflection occurs due to differences of the refractive indexes. Materials of the first film layer and the second film layer affect the refractive indexes. Depending on thicknesses and the refractive indexes of the first film layer and the second film layer, lights of different wavelengths may have different reflection effects. In order to achieve the required reflection effect (i.e., the reflectance being more than 99.5%, or even more than 99.9%), thickness requirements imposed on the first film layer and the second film layer are very strict in the present disclosure. To be specific, a thickness tolerance of each of the first film layer and the second film layer is less than 1%. When different materials are used, the corresponding thickness specifications and requirements will also be completely different.

Figure 6A:
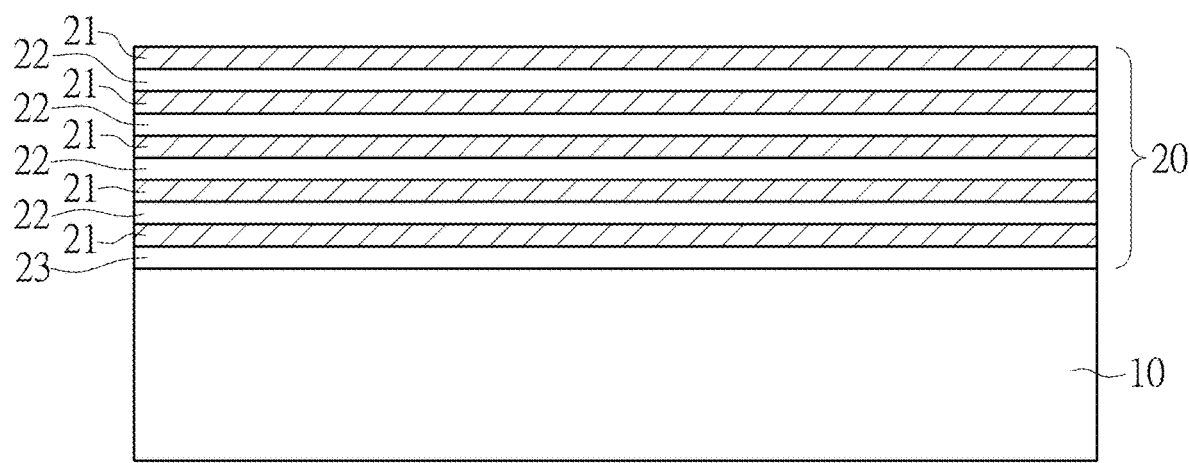
FIG. 6A is a side view of a bottom distributed Bragg reflector for a 1550 nm vertical-cavity surface-emitting laser according to the present disclosure.

Referring to FIG. 6A, in order to increase a reflectance of the bottom distributed Bragg reflector 20, the bottom distributed Bragg reflector 20 can include a reflective metal layer 23. Through the configuration of the reflective metal layer 23, a total layer number of the silicon layers 21 (i.e., the first film layers) and the silicon dioxide layers 22 (i.e., the second film layers) is decreased. In detail, the reflective metal layer 23 can be formed by a single metal layer or multiple metal layers. A thickness of the reflective metal layer 23 ranges from 20 nm to 100 nm, and a total thickness thereof preferably ranges from 50 nm to 100 nm. The material of the reflective metal layer 23 is selected from the group consisting of aluminum, silver, and molybdenum. However, the present disclosure is not limited thereto.

Figure 9:
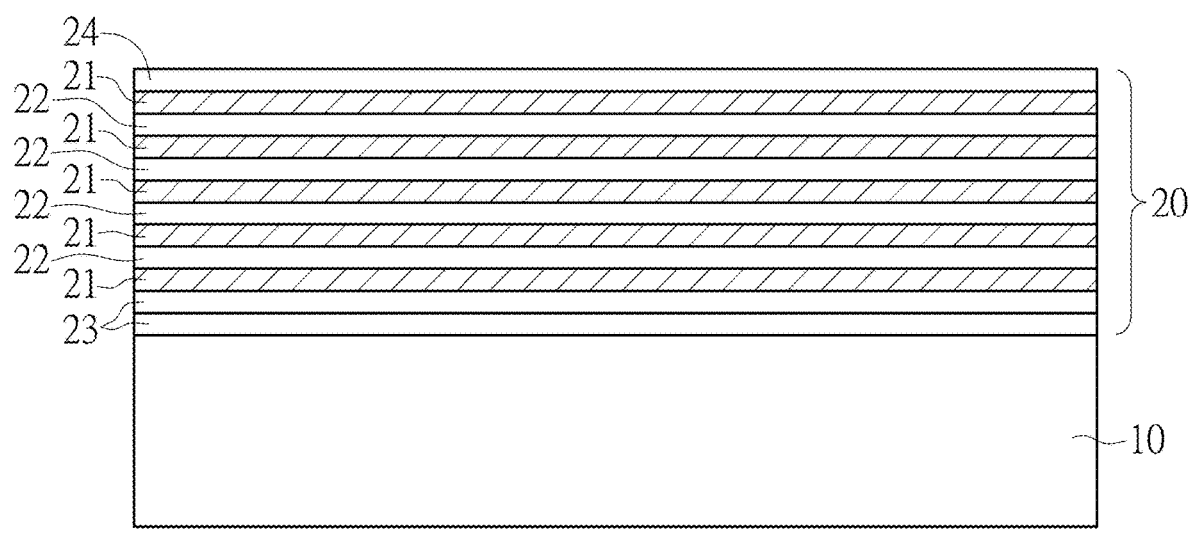
FIG. 9 is a side view of the bottom distributed Bragg reflector for the 1550 nm vertical-cavity surface-emitting laser that includes a thermal diffusion barrier layer.

In certain embodiments, the bottom distributed Bragg reflector 20 further includes a thermal diffusion barrier layer 24 (as shown in FIG. 9). The thermal diffusion barrier layer 24 is disposed on the first films layers and the second film layers, and is especially disposed on the silicon layer 21. The thermal diffusion barrier layer 24 can prevent silicon atoms in the silicon layer 21 from diffusing into a first-conductive-type semiconductor layer 31 (N-type electrode). In the present embodiment, the material of the thermal diffusion barrier layer 24 can be niobium pentoxide, tantalum pentoxide, or titanium dioxide. A thickness of the thermal diffusion barrier layer 24 ranges from 10 nm to 80 nm, and preferably ranges from 30 nm to 50 nm. More preferably, the thickness of the thermal diffusion barrier layer 24 is 40 nm.

An MQW active light-emitting structure layer is used to generate the laser beam L, and the laser beam L can be repeatedly reflected and resonated between the two reflector layers for gain amplification. A vertical cavity structure includes the first-conductive-type semiconductor layer 31 (i.e., an N-type gallium arsenide layer), the MQW active light-emitting structure layer 30, and a second-conductive-type semiconductor layer 33 (i.e., a P-type gallium arsenide layer). The MQW active light-emitting structure layer 30 is positioned between the first-conductive-type semiconductor layer 31 and the second-conductive-type semiconductor layer 33, and a current confinement layer is disposed between the MQW active light-emitting structure layer 30 and the second-conductive-type semiconductor layer 33.

The first-conductive-type semiconductor layer 31 and the second-conductive-type semiconductor layer 33 have opposite conductivity types. When the first-conductive-type semiconductor layer 31 is a P-type semiconductor, the second-conductive-type semiconductor layer 33 is an N-type semiconductor. When the first-conductive-type semiconductor layer 31 is the N-type semiconductor, the second-conductive-type semiconductor layer 33 is the P-type semiconductor. Specifically, materials of the first-conductive-type semiconductor layer 31 and the second-conductive-type semiconductor layer 33 can be gallium arsenide, but are not limited thereto.

In certain embodiments, after the bottom distributed Bragg reflector 20 is formed, a modification treatment can be performed on the bottom distributed Bragg reflector 20 before placement of the first-conductive-type semiconductor layer 31. In this way, a lattice matching layer is formed between the bottom distributed Bragg reflector 20 and the first-conductive-type semiconductor layer 31.

An electrode structure 50 includes the first-conductive-type semiconductor layer 31 (N-type electrode) and the second-conductive-type semiconductor layer 33 (P-type electrode). Through the configuration of the first-conductive-type semiconductor layer 31 and the second-conductive-type semiconductor layer 33, the laser device Z1 can be electrically connected to an external circuit. First metal electrodes 51 are disposed on the first-conductive-type semiconductor layer 31 (N-type electrode), and are electrically connected to the first-conductive-type semiconductor layer 31. Second metal electrodes 52 are disposed on the second-conductive-type semiconductor layer 33 (P-type electrode) and surround the top distributed Bragg reflector 40. The second metal electrodes 52 are electrically connected to the second-conductive-type semiconductor layer 33.

The present disclosure provides a design of the distributed Bragg reflector and a method for manufacturing the same. The distributed Bragg reflector is formed by sputtering, and is applied to a vertical-cavity surface-emitting laser. In the vertical-cavity surface-emitting laser, a reflectance of a top distributed Bragg reflector is as high as 98%, and the reflectance of the bottom distributed Bragg reflector is as high as 99.9%.

The method provided in the present disclosure is suitable for forming an optical multilayer film on a silicon wafer, a silicon carbide wafer, a gallium arsenide wafer, or the glass substrate, and is applied to the vertical-cavity surface-emitting laser for being used as the distributed Bragg reflector.

[Formation of an Aluminum Layer, a Molybdenum Layer, and a Silver Layer]

Figure 2:
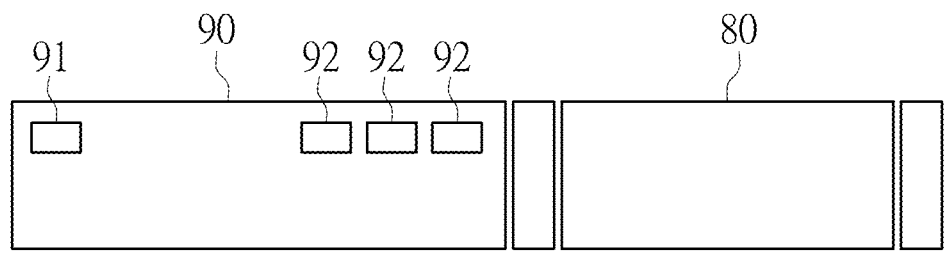
FIG. 2 is a schematic view of a vacuum load lock chamber, a sputtering chamber, and a micro-oxidation chamber used during formation of an optical multilayer film according to the present disclosure.
Figure 3:
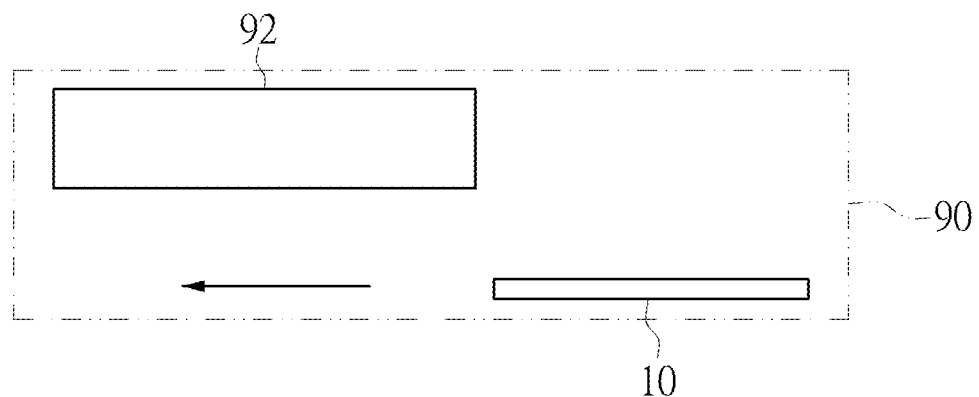
FIG. 3 is a schematic view showing a relative position between a substrate and a target during sputtering.

Reference is made to FIG. 2 and FIG. 3. A process of forming the reflective metal layer 23 includes: (1) placing the substrate 10 on a radio frequency (RF) carrier self-bias device 93 (i.e., a wafer holder), transferring the substrate 10 to a load lock chamber 80, and vacuum-pumping the load lock chamber 80 until a pressure thereof is lower than $1\times10^{-3}$ torr; (2) transferring the substrate 10 to a sputtering chamber 90, and maintaining a pressure within the sputtering chamber 90 at $5\times10^{-6}$ torr; and (3) moving the wafer holder carrying the substrate 10 to the front of a sputtering cathode (i.e., a target 92) in an argon atmosphere of $3\times10^{-3}$ torr, and sputter-depositing a molybdenum layer, a silver layer, or an aluminum layer (i.e., the reflective metal layer 23) on the substrate 10 by direct current (DC) sputtering or radio frequency (RF) sputtering. Manufacturing parameters include: a moving speed of the wafer holder ranging from 50 mm/min to 3,000 mm/min and an input power of the RF sputtering ranging from 0.5 kW to 3.0 kW. Thicknesses of the molybdenum layer, the silver layer, and the aluminum layer can be adjusted according to the structural configuration of the distributed Bragg reflector.

[Formation of a Silicon Layer and a Silicon Dioxide Layer]

Reference is made to FIG. 3, which is a schematic view showing a substrate being transferred to the front of a target for formation of a silicon layer or a silicon dioxide layer. In a plasma sputtering system, a sputtering plasma is produced by a DC sputtering power generator or an RF sputtering power generator with a frequency of 13.56 MHz. The used target 92 is an intrinsic single-crystal silicon target with a purity of 99.9999%. During a sputtering process, the RF carrier self-bias device 93 that carries the substrate 10 is moved to the front of the target 92, and sputtering is performed in the argon atmosphere of $3\times10^{-3}$ torr, so that one silicon layer having a specific thickness is deposited on a surface of the substrate 10. The manufacturing parameters include: the moving speed of the RF carrier self-bias device 93 ranging from 50 mm/min to 3,000 mm/min and the input power of the RF sputtering ranging from 0.5 kW to 3.0 kW. Thicknesses of the silicon layer and the silicon dioxide layer can be adjusted according to the configuration of the distributed Bragg reflector.

Figure 4A:
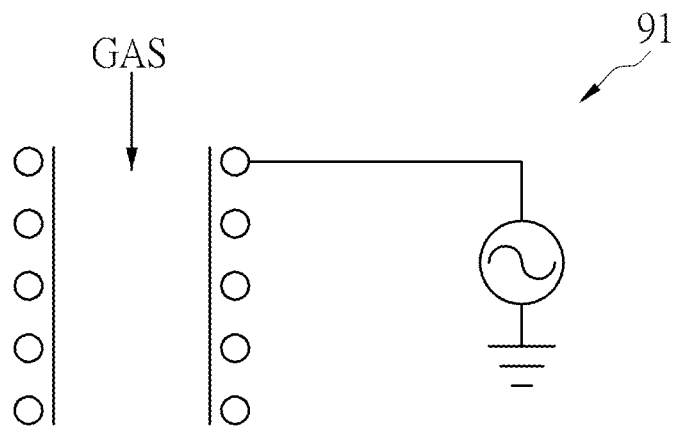
FIG. 4A is a schematic view of an inductively-coupled plasma device.
Figure 4B:
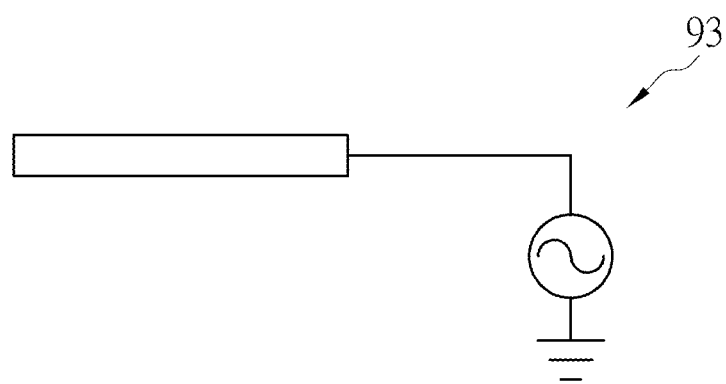
FIG. 4B is a schematic view of a radio frequency carrier self-bias device.

In the present disclosure, a radio frequency (RF) triggered inductively-coupled plasma apparatus (as shown in FIG. 4A) or an RF carrier self-bias device (as shown in FIG. 4B) can be used to produce a plasma for oxidizing a silicon film into a silicon dioxide film.

[Formation of the Silicon Layer]

Reference is made to FIG. 2 and FIG. 3. A process of forming the silicon layer includes: (1) placing the substrate 10 on the RF carrier self-bias device 93 (i.e., the wafer holder), transferring the substrate 10 to the load lock chamber 80, and vacuum-pumping the load lock chamber 80 until the pressure thereof is lower than $1\times10^{-3}$ torr; (2) transferring the substrate 10 from the load lock chamber 80 to the sputtering chamber 90, and maintaining the pressure within the sputtering chamber 90 at $5\times10^{-6}$ torr; and (3) moving the RF carrier self-bias device 93 carrying the substrate 10 to the front of the sputtering cathode (i.e., the target 92) in the argon atmosphere of $3\times10^{-3}$ torr, and sputter-depositing the silicon layer having a thickness of 100 nm to 300 nm on the substrate 10 by the DC or RF sputtering. The manufacturing parameters include: the moving speed of the wafer holder ranging from 50 mm/min to 3,000 mm/min and the input power of the RF sputtering ranging from 1.0 kW to 2.0 kW.

[Formation of the Silicon Dioxide Layer]

In the present disclosure, the silicon dioxide layer is formed by the process of nano-sputtering and micro-plasma oxidation. As shown in FIG. 2 and FIG. 3, the substrate 10 is placed on the RF carrier self-bias device 93 (i.e., the wafer holder) and transferred to the load lock chamber 80, and the load lock chamber 80 is vacuum-pumped until the pressure thereof is lower than $1\times10^{-3}$ torr. Then, the substrate 10 is transferred from the load lock chamber 80 to the sputtering chamber 90, and the pressure within the sputtering chamber 90 is maintained at $5\times10^{-6}$ torr. In the argon atmosphere of $3\times10^{-3}$ torr, the wafer holder carrying the substrate 10 is moved to the front of the sputtering cathode (i.e., the target 92), and the silicon film having a thickness of 2 nm is deposited on the substrate 10 by the DC or RF sputtering. The manufacturing parameters include: the moving speed of the wafer holder ranging from 50 mm/min to 3,000 mm/min and the input power of the RF sputtering ranging from 0.5 kW to 2.0 kW.

In a first operation condition, after sputtering of the silicon film having a thickness of 2 nm, the substrate 10 is moved to a radio frequency (RF) triggered inductively-coupled plasma apparatus 91, and a base pressure within the RF triggered inductively-coupled plasma apparatus 91 is maintained at $8\times10^{-6}$ torr. An input power of the RF triggered inductively-coupled plasma apparatus 91 ranges from 300 W to 1,000 W, and a plasma is produced as the frequency of 13.56 MHz passes through a radio frequency coil. A plasma gas contains a gas mixture of argon and oxygen, and a working pressure is controlled to be between 0.001 torr and 0.1 torr. In order to oxidize the silicon film into the silicon dioxide film, a treatment duration of the substrate 10 in the RF triggered inductively-coupled plasma apparatus 91 is two minutes to five minutes.

In a second operation condition, after sputtering of the silicon film having a thickness of 2 nm, the substrate 10 is moved to the RF carrier self-bias device 93, and a base pressure within the RF carrier self-bias device 93 is maintained at $8\times10^{-6}$ torr. An input power of a radio frequency plasma ranges from 500 W to 1,500 W, and the plasma is produced as the frequency of 13.56 MHz passes through a radio frequency power source. The plasma gas contains the gas mixture of argon and oxygen, and the working pressure is controlled to be between 0.005 torr and 0.1 torr. In order to oxidize the silicon film into the silicon dioxide film, the treatment duration of the substrate 10 in the RF carrier self-bias device 93 is two minutes to five minutes.

After the micro-plasma oxidation process, whether in the first operation condition or the second operation condition, the silicon film having a thickness of 2 nm can be oxidized into the silicon dioxide film having a thickness of 4 nm. Through repetition of the above-mentioned step, multiple layers of the silicon dioxide film can be stacked to each other, and one silicon dioxide layer having a specific thickness can be formed. For example, based on the first operation condition or the second operation condition mentioned above, the step of forming the silicon film having a thickness of 2 nm and then oxidizing the same into the silicon dioxide film having a thickness of 4 nm is repeated 25 times, so as to form the silicon dioxide layer having a thickness of 100 nm. If the desired thickness of the silicon dioxide layer is not an integer multiple of 4 nm, such as 102 nm (for which the above-mentioned step needs to be repeated 25.5 times), the input power can be adjusted according to linearity. In one specific step, the silicon film having a thickness of 1 nm is formed, and is then oxidized into the silicon dioxide film having a thickness of 2 nm, so that the silicon dioxide layer can have the desired thickness. Usually, the specific step will be performed as a final step of the whole process.

As mentioned above, forming the silicon dioxide layer having a thickness of 100 nm is equivalent to repeating the above-mentioned step 25 times. Forming the silicon dioxide layer having a thickness of 102 nm is equivalent to repeating the above-mentioned step 25 times plus performing the specific step once.

Figure 5A:
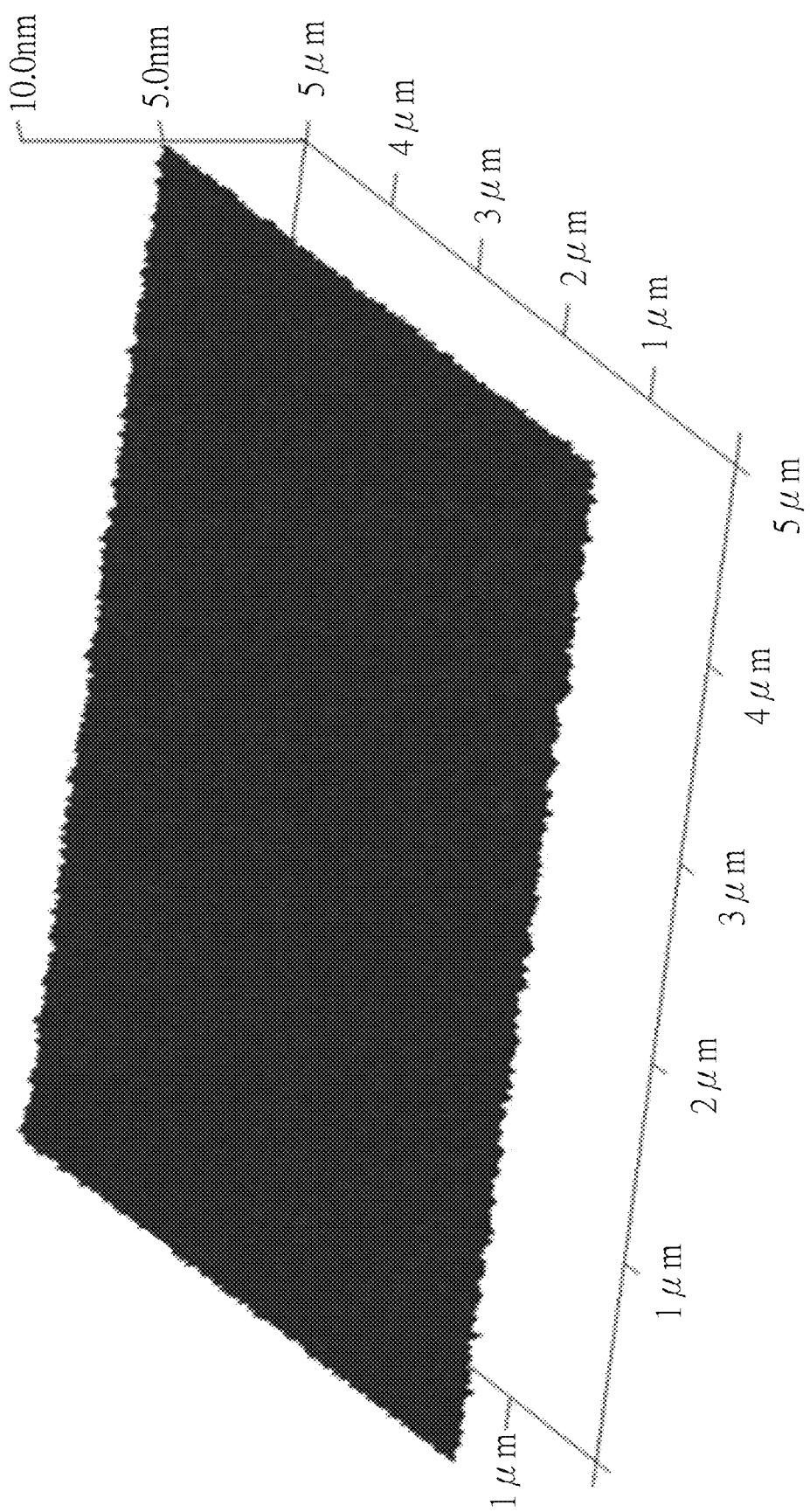
FIG. 5A is an atomic force microscope image showing a surface of a silicon dioxide layer having a thickness of 209.4 nm and produced by a process of nano-sputtering and micro-plasma oxidation according to the present disclosure.
Figure 5B:
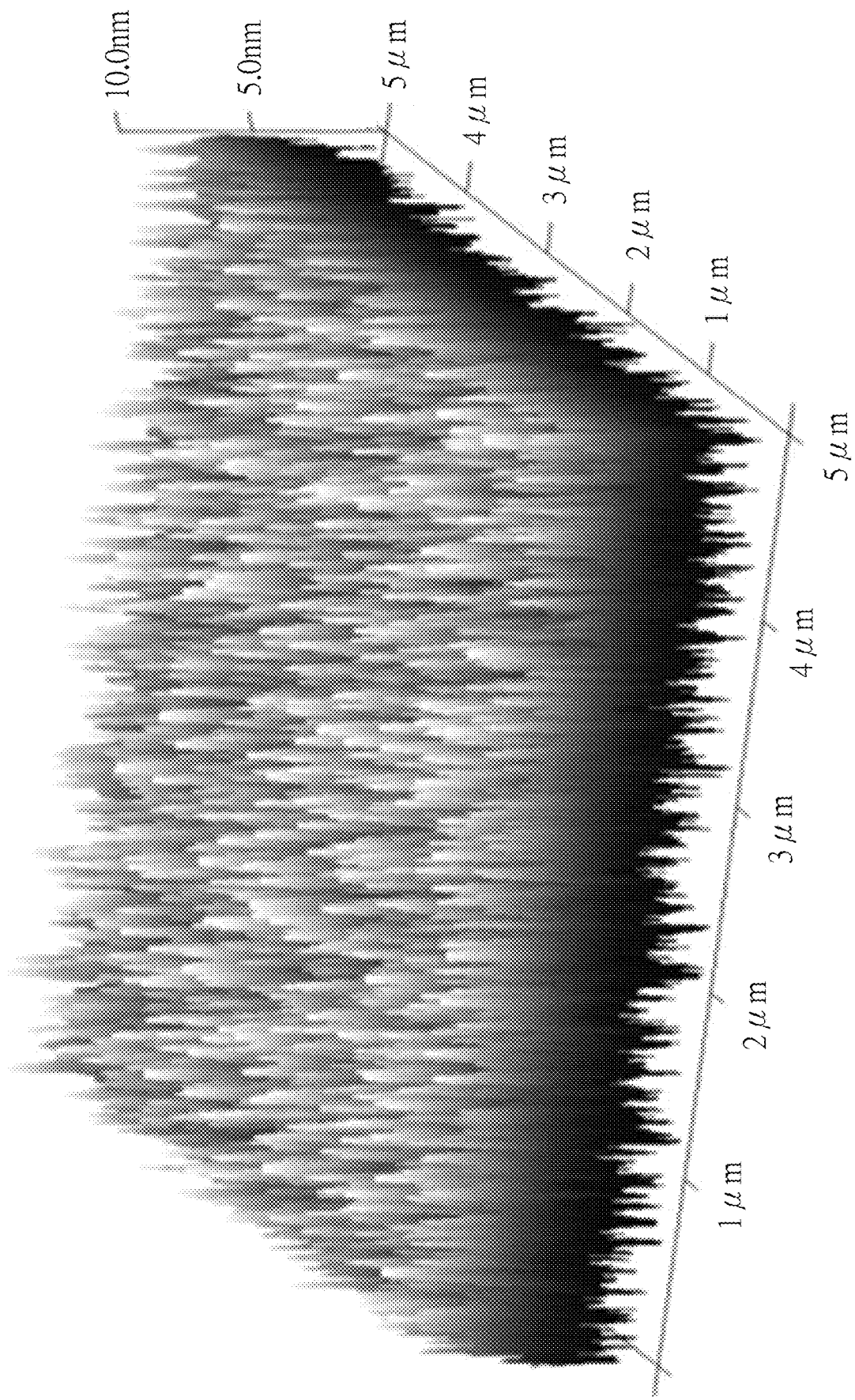
FIG. 5B is an atomic force microscope image showing a surface of a silicon dioxide layer having a thickness of 200 nm and formed by conventional reactive sputtering.

In the present disclosure, through the process of nano-sputtering and micro-plasma oxidation, the thickness of each layer of the silicon dioxide film and a surface roughness of the silicon dioxide film along a c-axis can be precisely controlled. In one exemplary embodiment, for the silicon dioxide layer having a thickness of 200 nm, its thickness variability and surface roughness along the c-axis are both less than 2 nm, and can even be less than 1.5 nm (as shown in FIG. 5A). In contrast, if the silicon dioxide layer having a thickness of 200 nm is formed by conventional reactive sputtering in one single step and in a mixed atmosphere of argon gas and oxygen, the surface roughness of the silicon dioxide layer along the c-axis can be as high as 15 nm to 20 nm (as shown in FIG. 5B).

Reference is made to FIG. 1. In order to prove that the method provided in the present disclosure is able to precisely control the thickness of the silicon dioxide layer, silicon dioxide layers of Example 1 and Example 2 are produced based on the above-mentioned step (i.e., the second operation condition). Specifically, an amorphous silicon film of 2 nm is first sputter-deposited, and is then oxidized into the silicon dioxide film by an oxygen plasma of 600 W. After repeated stacking, the silicon dioxide layers of Example 1 and Example 2 can be obtained. The thickness of each silicon dioxide layer and a roughness of a surface of each silicon dioxide layer are listed in Table 1, and said roughness is measured by use of an atomic force microscope (AFM).

TABLE 1

| | Step repeated times | Thickness of silicon dioxide layer (nm) | Arithmetic average roughness (Ra) (nm) | Root-mean-square roughness (Rq) (nm) | Average peak-to-valley depth (Z) (nm) |
|---|---|---|---|---|---|
| Sample 1 | 48 | 209.4 | 0.10 | 0.13 | 1.15 |
| Sample 2 | 72 | 303.6 | 0.09 | 0.11 | 1.02 |

Based on results of Table 1, for the surface of the silicon dioxide layer, its arithmetic average roughness (Ra) is less than 0.2 nm (preferably less than 0.12 nm), its root-mean-square roughness (Rq) is less than 0.2 nm (preferably less than 0.15 nm), and its average peak-to-valley depth (Z) is less than 1.5 nm (preferably less than 1.3 nm).

[Formation of a Bottom Distributed Bragg Reflector for a 1550 nm Vertical-Cavity Surface-Emitting Laser]

As shown in FIG. 2, the substrate 10 is placed on the wafer holder and transferred to the load lock chamber 80, and the load lock chamber 80 is vacuum-pumped until the pressure thereof is lower than $1\times10^{-3}$ torr. Then, the substrate 10 is transferred from the load lock chamber 80 to the sputtering chamber 90, and the pressure within the sputtering chamber 90 is maintained at $5\times10^{-6}$ torr. In the argon atmosphere of $3\times10^{-3}$ torr, the aluminum layer having a thickness of 80 nm is sputter-deposited on the substrate 10 by the DC or RF sputtering.

Figure 6B:
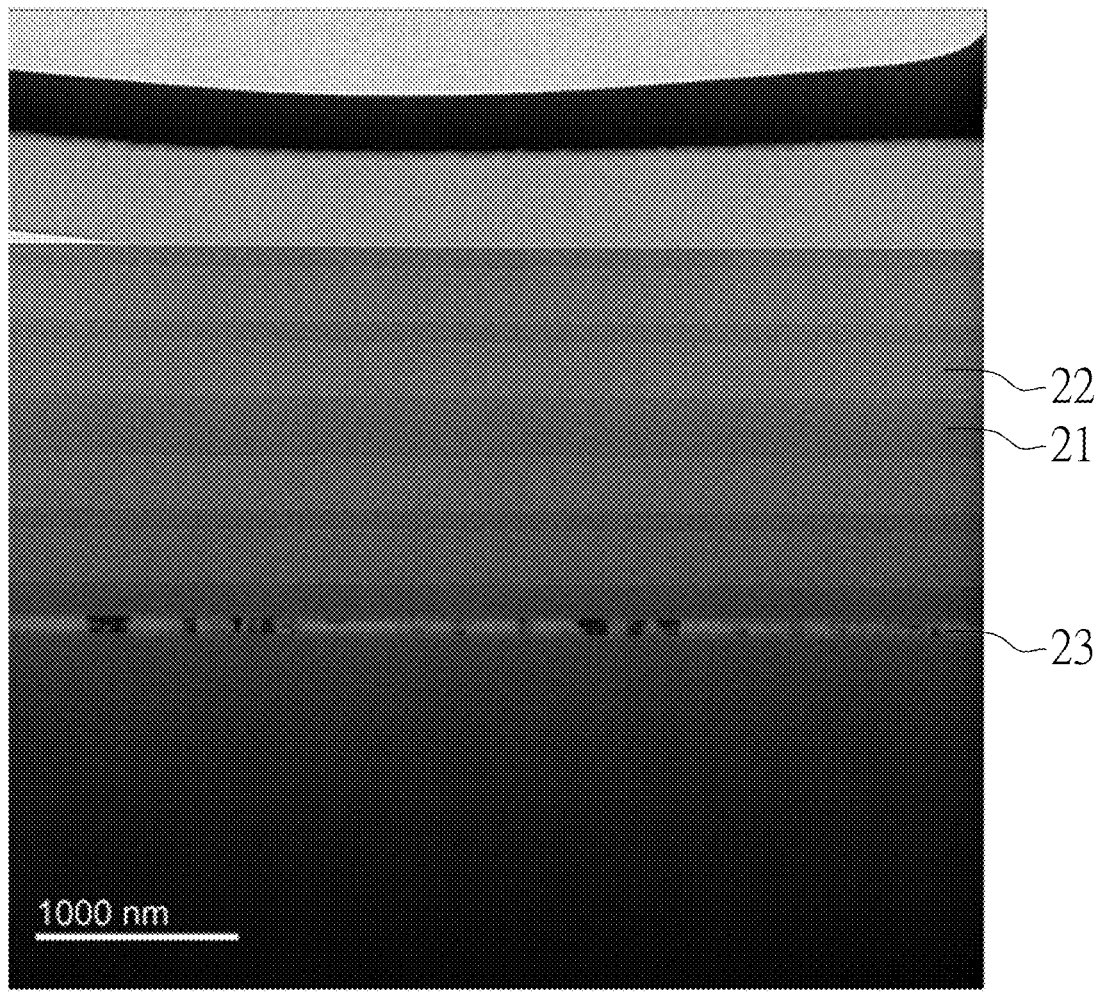
FIG. 6B is a transmission electron microscope image of a distributed Bragg reflector manufactured by the process of nano-sputtering and micro-plasma oxidation according to the present disclosure.

Reference is made to FIG. 6A, which shows a structural configuration of the bottom distributed Bragg reflector 20 of the present disclosure. According to a formation sequence on the aluminum layer (i.e., the reflective metal layer 23), the silicon layer 21 and the silicon dioxide layer 22 of a first group respectively have a thickness of 173.3 nm and a thickness of 270 nm, the silicon layer 21 and the silicon dioxide layer 22 of a second group respectively have a thickness of 98.2 nm and a thickness of 270.4 nm, the silicon layer 21 and the silicon dioxide layer 22 of a third group respectively have a thickness of 295.2 nm and a thickness of 269.8 nm, and the silicon layer 21 and the silicon dioxide layer 22 of a fourth group respectively have a thickness of 98.4 nm and a thickness of 269.9 nm. Finally, the silicon layer 21 having a thickness of 98.4 nm is further formed on the uppermost silicon dioxide layer 22. In the present disclosure, each layer has a smooth surface of excellent quality. Reference is made to FIG. 6B, which is a transmission electron microscope image of the bottom distributed Bragg reflector. In FIG. 6B, a dark-colored layer corresponds to the silicon layer 21, a light-colored layer corresponds to the silicon dioxide layer 22, and a patterned layer corresponds to the aluminum layer (i.e., the reflective metal layer 23).

Figure 7:
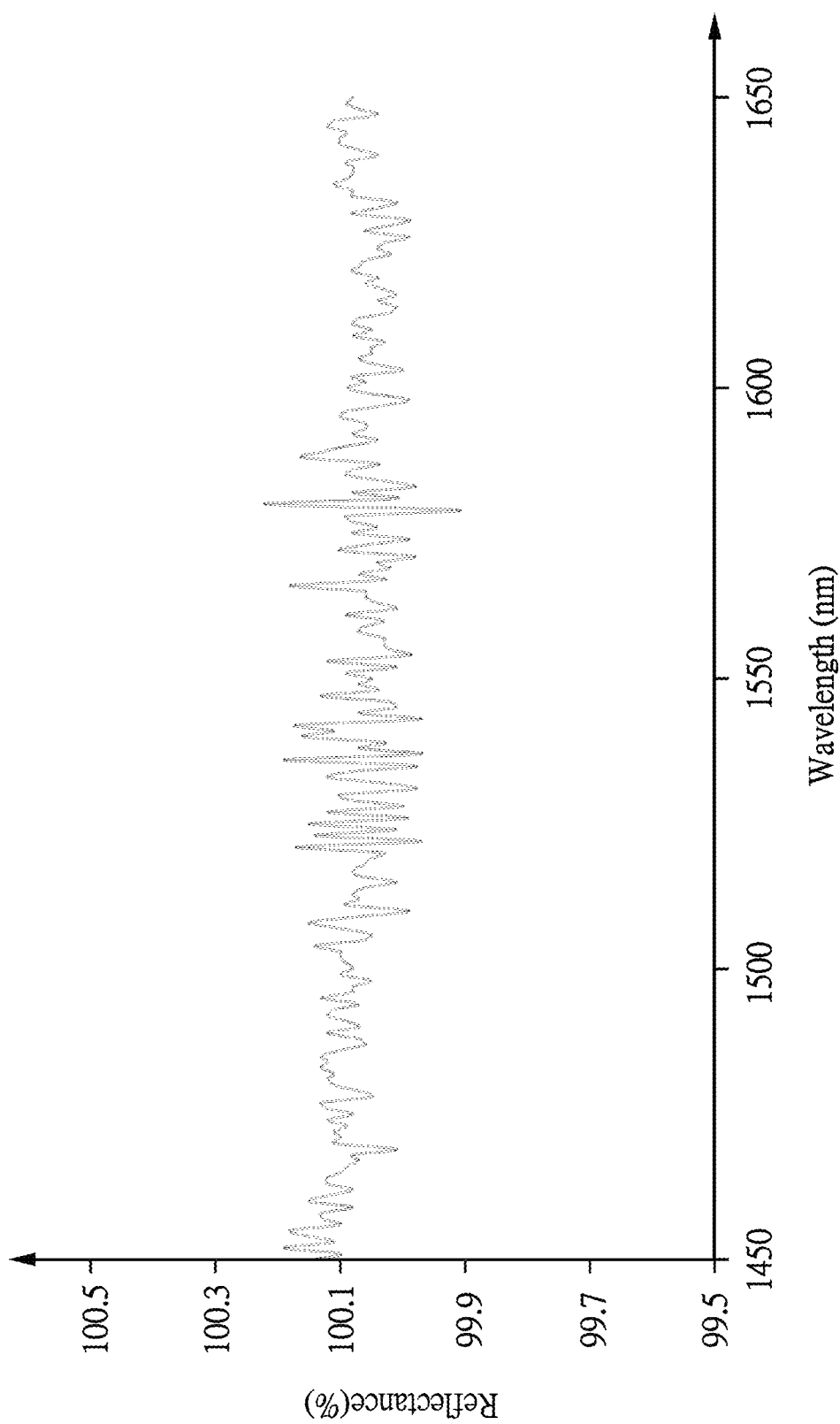
FIG. 7 is a diagram showing a spectral reflectance curve of the bottom distributed Bragg reflector for the 1550 nm vertical-cavity surface-emitting laser when a wavelength of light is within a range from 1,450 nm to 1,650 nm.

Reference is made to FIG. 7, which is a diagram showing a spectral reflectance curve of the bottom distributed Bragg reflector measured by use of a reflectance measuring instrument (brand: Hitachi, Ltd.; model: U4100). Based on the structural configuration above, the bottom distributed Bragg reflector 20 of the present disclosure has an average reflectance of 100.06% for lights within a wavelength range from 1,450 nm to 1,650 nm, and can be applied to a 1550 nm vertical-cavity surface-emitting laser.

A total thickness of the above-mentioned distributed Bragg reflector is approximately 2,000 nm. Through the process of nano-sputtering and micro-plasma oxidation, the surface roughness of the silicon dioxide layer along the c-axis can be precisely controlled in the present disclosure. When observed under the atomic force microscope, the distributed Bragg reflector has an arithmetic average roughness (Ra) of 0.25 nm, a root-mean-square roughness (Rq) of 0.32 nm, and an average peak-to-valley depth (Z) of 3.10 nm.

The method for manufacturing the distributed Bragg reflector provided in the present disclosure can be applied to the bottom distributed Bragg reflector 20 or the top distributed Bragg reflector 40 for the 1550 nm vertical-cavity surface-emitting laser. The optical multilayer film of the bottom distributed Bragg reflector 20 is produced by the process of nano-sputtering and micro-plasma oxidation, and the reflectance of the bottom distributed Bragg reflector 20 can be as high as 99.9% to 100%. In the present disclosure, the suitable substrate 10 can be the silicon wafer, the gallium arsenide wafer, the silicon carbide wafer, or the glass substrate. Referring to FIG. 6A, the method for manufacturing the bottom distributed Bragg reflector 20 includes: forming the reflective metal layer 23 (i.e., the aluminum layer) on the substrate 10, forming the amorphous silicon layer 21 on the reflective metal layer 23, forming the silicon dioxide layer 22 by the process of nano-sputtering and micro-plasma oxidation, and repeating the steps mentioned above, so as to form the amorphous silicon layers 21 (high reflectance) and the silicon dioxide layers 22 (low reflectance) that are alternately stacked to each other. In this way, the desired reflectance can be achieved.

[Formation of a Top Distributed Bragg Reflector for the 1550 nm Vertical-Cavity Surface-Emitting Laser]

Figure 8:
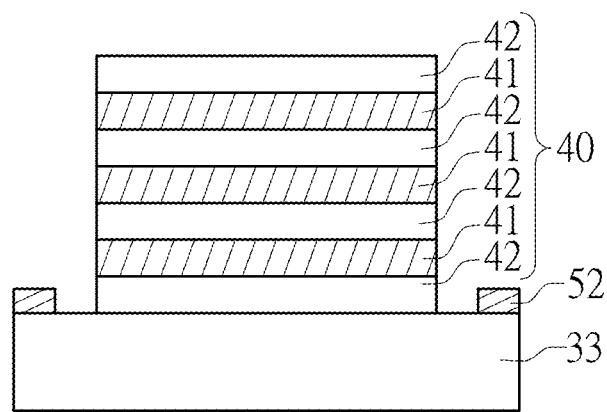
FIG. 8 is a side view of a top distributed Bragg reflector for the 1550 nm vertical-cavity surface-emitting laser according to the present disclosure.

The distributed Bragg reflector of the present disclosure can be used as the bottom distributed Bragg reflector 20 or the top distributed Bragg reflector 40 for the 1550 nm vertical-cavity surface-emitting laser. The optical multilayer film of the top distributed Bragg reflector 40 is formed by the process of nano-sputtering and micro-plasma oxidation, and a reflectance of the top distributed Bragg reflector 40 can be as high as 98.0% to 99.0%. As shown in FIG. 8, the top distributed Bragg reflector 40 of the present disclosure is suitable for being formed on the second-conductive-type semiconductor layer 33 (i.e., the P-type gallium arsenide layer). Referring to FIG. 8, the method for manufacturing the top distributed Bragg reflector 40 includes: forming a silicon layer 41 on the second-conductive-type semiconductor layer 33 (i.e., the P-type gallium arsenide layer), forming a silicon dioxide layer 42 by the process of nano-sputtering and micro-plasma oxidation, and repeating the steps mentioned above, so as to form the amorphous silicon layers 41 (high reflectance) and the silicon dioxide layers 42 (low reflectance) that are alternately stacked to each other. In this way, the desired reflectance can be achieved.

Referring to FIG. 2 and FIG. 4B, the method for manufacturing the top distributed Bragg reflector includes: (1) placing the P-type gallium arsenide layer on the RF carrier self-bias device 93, transferring the P-type gallium arsenide layer to the load lock chamber 80, and vacuum-pumping the load lock chamber 80 until the pressure thereof is lower than $1 \times 10^{-3}$ torr; (2) transferring the P-type gallium arsenide layer to the sputtering chamber 90, and maintaining the pressure within the sputtering chamber 90 at $5 \times 10^{-6}$ torr; and (3) forming, based on the first operation condition or the second operation condition, the silicon dioxide layer by sputtering (via the process of nano-sputtering and micro-plasma oxidation) in the argon atmosphere of $3 \times 10^{-3}$ torr. Specific details of the first operation condition and the second operation condition are as described above and will not be repeated herein.

Reference is made to FIG. 8, which shows a structural configuration of the top distributed Bragg reflector 40 of the present disclosure. According to the formation sequence on the second-conductive-type semiconductor layer 33 (i.e., the P-type gallium arsenide layer), the silicon dioxide layer 42 and the silicon layer 41 of a first group respectively have a thickness of 543.9 nm and a thickness of 100.3 nm, the silicon dioxide layer 42 and the silicon layer 41 of a second group respectively have a thickness of 271.7 nm and a thickness of 100.3 nm, and the silicon dioxide layer 42 and the silicon layer 41 of a third group respectively have a thickness of 272.2 nm and a thickness of 100.1 nm. Finally, the silicon dioxide layer 42 having a thickness of 272 nm is formed on the uppermost silicon layer 41.

Based on the structural configuration above, the top distributed Bragg reflector 40 of the present disclosure has an average reflectance of 98.8% for the lights within the wavelength range from 1,450 nm to 1,650 nm, and can be applied to the 1550 nm vertical-cavity surface-emitting laser.

[Formation of a Refractory Metal Oxide Thin Layer (e.g., a Niobium Pentoxide Layer) for being Used as a Thermal Diffusion Barrier Layer on the Bottom Distributed Bragg Reflector for the 1550 nm Vertical-Cavity Surface-Emitting Laser]

The distributed Bragg reflector of the present disclosure can be used as the bottom distributed Bragg reflector 20 or the top distributed Bragg reflector 40 for the 1550 nm vertical-cavity surface-emitting laser. The optical multilayer film of the bottom distributed Bragg reflector 20 is formed by the process of nano-sputtering and micro-plasma oxidation. An optical reflectance of the bottom distributed Bragg reflector 20 can be as high as 99.9% to 100%. Then, by way of metal-organic chemical vapor deposition (MOCVD), the N-type gallium arsenide layer (i.e., the first-conductive-type semiconductor layer 31), a multiple quantum well (i.e., the MQW active light-emitting structure layer 30), and the P-type gallium arsenide layer (i.e., the second-conductive-type semiconductor layer 33) are sequentially formed on the bottom distributed Bragg reflector 20. On the other hand, since a manufacturing temperature of the conventional metal-organic chemical vapor deposition is as high as 800° C., the silicon atoms in the bottom distributed Bragg reflector 20 are likely to diffuse into the N-type gallium arsenide layer (i.e., the first-conductive-type semiconductor layer 31) at a high temperature. In order to prevent diffusion of the silicon atoms, a refractory metal oxide thin layer (e.g., a niobium pentoxide layer) is disposed on the uppermost silicon layer 21 of the bottom distributed Bragg reflector 20 for being used as the thermal diffusion barrier layer 24. As shown in FIG. 9, the thickness of the thermal diffusion barrier layer 24 is designed to satisfy an optical interference principle and to maintain the high reflectance characteristic (from 99.9% to 100%) of the bottom distributed Bragg reflector 20.

Referring to FIG. 2, the method for manufacturing the bottom distributed Bragg reflector includes: (1) placing the substrate 10 on the RF carrier self-bias device 93, transferring the substrate 10 to the load lock chamber 80, and vacuum-pumping the load lock chamber 80 until the pressure thereof is lower than $1 \times 10^{-3}$ torr; (2) transferring the substrate 10 from the load lock chamber 80 to the sputtering chamber 90, and maintaining the pressure within the sputtering chamber 90 at $5 \times 10^{-6}$ torr; and (3) sputter-depositing the molybdenum layer having a thickness of 60 nm on the substrate 10, and then sputter-depositing the silver layer having a thickness of 20 nm on the molybdenum layer by the DC or RF sputtering in the argon atmosphere of $3 \times 10^{-3}$ torr. In addition, based on the above-mentioned steps, the silicon layers 21 and the silicon dioxide layers 22 that are alternately stacked to each other are formed on the silver layer (i.e., the reflective metal layer 23).

Reference is made to FIG. 9, which shows the structural configuration of the bottom distributed Bragg reflector 20 of the present disclosure. According to the formation sequence on the silver layer (i.e., the reflective metal layer 23), the silicon layer 21 and the silicon dioxide layer 22 of the first group respectively have a thickness of 173.3 nm and a thickness of 270 nm, the silicon layer 21 and the silicon dioxide layer 22 of the second group respectively have a thickness of 98.4 nm and a thickness of 269.9 nm, the silicon layer 21 and the silicon dioxide layer 22 of the third group respectively have a thickness of 295.2 nm and a thickness of 269.9 nm, and the silicon layer 21 and the silicon dioxide layer 22 of the fourth group respectively have a thickness of 98.5 nm and a thickness of 269.3 nm. Finally, the silicon layer 21 having a thickness of 89.4 nm and the niobium pentoxide layer having a thickness of 20 nm are sequentially formed on the uppermost silicon dioxide layer 22.

Figure 10:
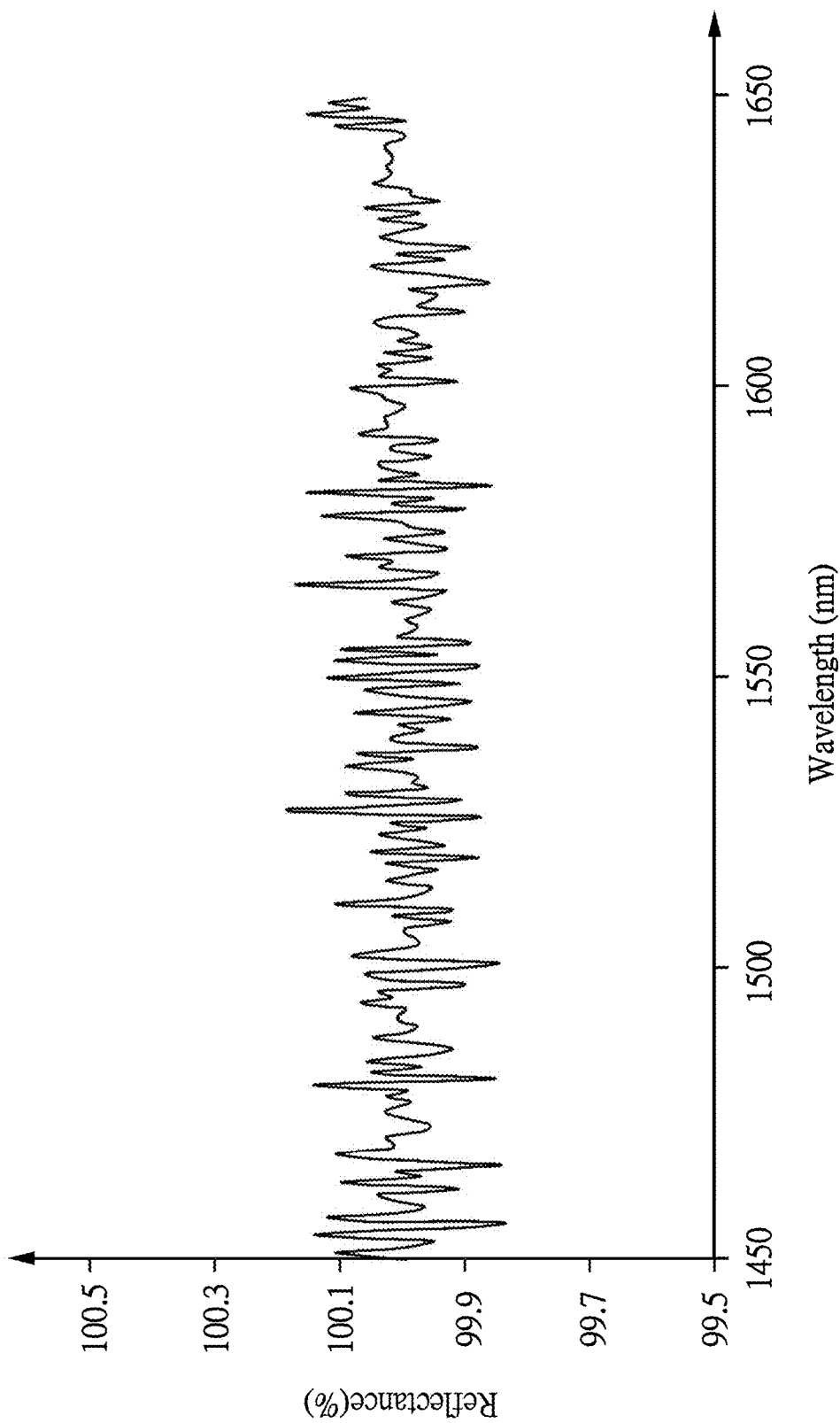
FIG. 10 is a diagram showing a spectral reflectance curve of the bottom distributed Bragg reflector for the 1550 nm vertical-cavity surface-emitting laser that includes the thermal diffusion barrier layer when the wavelength of light is within the range from 1,450 nm to 1,650 nm.

Referring to FIG. 10, based on the structural configuration above, the bottom distributed Bragg reflector 20 of the present disclosure has the average reflectance of 100.06% for the lights within the wavelength range from 1,450 nm to 1,650 nm, and can be applied to the 1550 nm vertical-cavity surface-emitting laser.

A total thickness of the above-mentioned bottom distributed Bragg reflector 20 is approximately 2,000 nm. Through the process of nano-sputtering and micro-plasma oxidation, the surface roughness of the silicon dioxide layer along the c-axis can be precisely controlled in the present disclosure. When observed under the atomic force microscope, the bottom distributed Bragg reflector 20 that includes the thermal diffusion barrier layer 24 has an arithmetic average roughness (Ra) of 0.18 nm, a root-mean-square roughness (Rq) of 0.23 nm, and an average peak-to-valley depth (Z) of 2.00 nm.

Beneficial Effects of the Embodiments

In conclusion, in the method for manufacturing the distributed Bragg reflector provided by the present disclosure, by virtue of "forming the silicon layers and the silicon dioxide layers that are repeatedly and alternately stacked to each other on the silver layer" and "forming the silicon dioxide layers by the process of nano-sputtering and micro-plasma oxidation," the reflectance of the distributed Bragg reflector can be enhanced, thereby improving a light-emitting efficiency of a laser device.

More specifically, the silicon dioxide layer or the silicon layer is formed by sputtering and the process of nano-sputtering and micro-plasma oxidation, so that the thickness of the silicon dioxide layer or the silicon layer can be precisely controlled in the present disclosure. Further, the surface of the silicon dioxide layer or the silicon layer has a high flatness. In this way, the reflectance of the distributed Bragg reflector can be as high as 99.9%.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for manufacturing a distributed Bragg reflector, wherein the distributed Bragg reflector is applied to a 1550 nm vertical-cavity surface-emitting laser for being used as a top distributed Bragg reflector or a bottom distributed Bragg reflector, the method comprising:
    forming an optical multilayer film on a substrate, wherein the substrate is a silicon wafer, a gallium arsenide wafer, a silicon carbide wafer, or a glass substrate;
    wherein, when the distributed Bragg reflector is applied to the 1550 nm vertical-cavity surface-emitting laser for being used as the bottom distributed Bragg reflector, the step of forming the optical multilayer film includes: forming a reflective metal layer on the substrate, and forming silicon layers and silicon dioxide layers that are alternately stacked to each other on the reflective metal layer; wherein the silicon dioxide layers are formed by a process of nano-sputtering and micro-plasma oxidation; and
    wherein, when the distributed Bragg reflector is applied to the 1550 nm vertical-cavity surface-emitting laser for being used as the bottom distributed Bragg reflector, the reflective metal layer includes a molybdenum layer and a silver layer; wherein, according to a formation sequence on the substrate, the optical multilayer film includes: the molybdenum layer having a thickness of 60 nm, the silver layer having a thickness of 20 nm, the silicon layer having a thickness of 173.3 nm, the silicon dioxide layer having a thickness of 270 nm, the silicon layer having a thickness of 98.2 nm, the silicon dioxide layer having a thickness of 270.4 nm, the silicon layer having a thickness of 295.2 nm, the silicon dioxide layer having a thickness of 269.8 nm, the silicon layer having a thickness of 98.4 nm, the silicon dioxide layer having a thickness of 269.9 nm, and the silicon layer having a thickness of 98.4 nm; wherein a thickness tolerance of each of the layers in the optical multilayer film is less than ±1%.

2. The method according to claim 1, wherein, when the distributed Bragg reflector is applied to the 1550 nm vertical-cavity surface-emitting laser for being used as the bottom distributed Bragg reflector, a reflectance of the distributed Bragg reflector ranges from 99.9% to 100%.

3. The method according to claim 1, wherein, when the distributed Bragg reflector is applied to the 1550 nm vertical-cavity surface-emitting laser for being used as the top distributed Bragg reflector, a reflectance of the distributed Bragg reflector ranges from 96% to 99%.

4. The method according to claim 1, wherein, when the distributed Bragg reflector is applied to the 1550 nm vertical-cavity surface-emitting laser for being used as the top distributed Bragg reflector, the substrate is the gallium arsenide wafer; wherein, according to a formation sequence on the substrate, the optical multilayer film includes: the silicon dioxide layer having a thickness of 543.9 nm, the silicon layer having a thickness of 100.3 nm, the silicon dioxide layer having a thickness of 271.7 nm, the silicon layer having a thickness of 100.3 nm, the silicon dioxide layer having a thickness of 272.2 nm, the silicon layer having a thickness of 100.1 nm, and the silicon dioxide layer having a thickness of 272 nm; wherein a thickness tolerance of each of the layers in the optical multilayer film is less than ±1%.

5. The method according to claim 1, wherein, when the distributed Bragg reflector is applied to the 1550 nm vertical-cavity surface-emitting laser for being used as the bottom distributed Bragg reflector, a thermal diffusion barrier layer is formed on the optical multilayer film, and the thermal diffusion barrier layer is formed by a process of step sputtering and micro-oxidation; wherein a reflectance of the bottom distributed Bragg reflector ranges from 99.9% to 100%.

6. A method for manufacturing a distributed Bragg reflector, wherein the distributed Bragg reflector is applied to a 1550 nm vertical-cavity surface-emitting laser for being used as a top distributed Bragg reflector or a bottom distributed Bragg reflector, the method comprising:

forming an optical multilayer film on a substrate, wherein the substrate is a silicon wafer, a gallium arsenide wafer, a silicon carbide wafer, or a glass substrate;

wherein, when the distributed Bragg reflector is applied to the 1550 nm vertical-cavity surface-emitting laser for being used as the bottom distributed Bragg reflector, the step of forming the optical multilayer film includes: forming a reflective metal layer on the substrate, and forming silicon layers and silicon dioxide layers that are alternately stacked to each other on the reflective metal layer; wherein the silicon dioxide layers are formed by a process of nano-sputtering and micro-plasma oxidation; and wherein, when the distributed Bragg reflector is applied to the 1550 nm vertical-cavity surface-emitting laser for being used as the bottom distributed Bragg reflector, the reflective metal layer includes a molybdenum layer and a silver layer; wherein, according to a formation sequence on the substrate, the optical multilayer film includes: the molybdenum layer having a thickness of 60 nm, the silver layer having a thickness of 20 nm, the silicon layer having a thickness of 173.3 nm, the silicon dioxide layer having a thickness of 270 nm, the silicon layer having a thickness of 98.4 nm, the silicon dioxide layer having a thickness of 269.9 nm, the silicon layer having a thickness of 295.2 nm, the silicon dioxide layer having a thickness of 269.9 nm, the silicon layer having a thickness of 98.5 nm, the silicon dioxide layer having a thickness of 269.3 nm, the silicon layer having a thickness of 89.4 nm, and a niobium pentoxide layer having a thickness of 20 nm; wherein a thickness tolerance of each of the layers in the optical multilayer film is less than ±1%.

7. The method according to claim 1, wherein the reflective metal layer is formed by a single metal layer or multiple metal layers, and a material of the reflective metal layer is selected from the group consisting of aluminum, silver, and molybdenum.

8. The method according to claim 1, wherein the reflective metal layer includes an aluminum layer, and a thickness of the aluminum layer ranges from 70 nm to 90 nm.

9. The method according to claim 1, wherein the reflective metal layer includes a molybdenum layer and a silver layer, a thickness of the molybdenum layer ranges from 50 nm to 70 nm, and a thickness of the silver layer ranges from 10 nm to 30 nm.

* * * * *